United States Patent [19]

Shiozawa et al.

[11] Patent Number: 4,931,334

[45] Date of Patent: Jun. 5, 1990

[54] IMAGE RECEIVING WEB FOR ADHESIVE TRANSFER

[75] Inventors: Etsuo Shiozawa; Keishi Kato; Yoshiki Yoshimi, all of Kanagawa, Japan

[73] Assignee: Fuji Photo Film Co., Ltd., Kanagawa, Japan

[21] Appl. No.: 294,839

[22] Filed: Jan. 9, 1989

Related U.S. Application Data

[62] Division of Ser. No. 133,458, Dec. 15, 1987, Pat. No. 4,863,453.

[30] Foreign Application Priority Data

Dec. 16, 1986 [JP] Japan ................................ 61-299168
Dec. 16, 1986 [JP] Japan ................................ 61-299169

[51] Int. Cl.[5] ................................................ B32B 3/00

[52] U.S. Cl. .................................... 428/137; 428/192; 428/211; 282/12 A; 282/12 R; 283/62; 40/638

[58] Field of Search ................... 428/40, 42, 211, 192, 428/137; 282/12 A, 12 R; 283/62; 40/2 R

[56] References Cited

U.S. PATENT DOCUMENTS

| | | | |
|---|---|---|---|
| 3,916,051 | 10/1975 | Wakeman | 428/40 |
| 4,379,573 | 4/1983 | Lomeli et al. | 428/42 |
| 4,542,052 | 9/1985 | Shadbolt et al. | 428/42 |
| 4,830,406 | 5/1989 | Instance | 428/40 |

FOREIGN PATENT DOCUMENTS

| | | |
|---|---|---|
| 2242920 | 5/1975 | France . |
| 2164915 | 4/1986 | United Kingdom . |

*Primary Examiner*—Patrick Ryan
*Attorney, Agent, or Firm*—Sughrue, Mion, Zinn, Macpeak & Seas

[57] ABSTRACT

In a method of and apparatus for adhesive transfer, an image receiving web comprising a belt-shaped, release agent coated paper and a plurality of transfer sheets having adhesive surfaces and put side by side on the release agent coated paper in the longitudinal direction thereof is used. The transfer sheets are separated one after another from the release agent coated paper, and each separated transfer sheet is wound around a transfer roller with the adhesive surface facing out. The transfer roller is moved to contact a photosensitive material drum carrying a toner image formed thereon, and the toner image is transferred from the photosensitive material drum to the adhesive surface of the transfer sheet while the transfer roller and the photosensitive material drum are rotated. The transfer roller is then moved to contact a push roller, and a supporting sheet is passed together with the transfer sheet between the transfer roller and the push roller, thereby to adhere the transfer sheet to the supporting sheet.

4 Claims, 5 Drawing Sheets

IMAGE RECEIVING WEB FOR ADHESIVE TRANSFER

This is a division of application Ser. No. 133,458, filed 12/15/87, now U.S. Pat. No. 4,863,453.

BACKGROUND OF THE INVENTION

1. Field of the Invention

This invention relates to an adhesive transfer method for transferring a toner image formed on a photosensitive material drum by an electrophotographic process to a transfer sheet provided with an adhesive surface, and an apparatus for carrying out the adhesive transfer method. This invention particularly relates to an adhesive transfer method for accurately carrying out the adhesive transfer and enabling simplification of the transfer mechanism, and an apparatus for carrying out the adhesive transfer method. This invention also relates to an image receiving web for adhesive transfer which is provided with transfer sheets and used for the adhesive transfer method and apparatus.

2. Description of the Prior Art

There have heretofore been known electric copying machines or electrophotographic printers for forming an electrostatic latent image on a uniformly charged photoconductor by projection of an original image thereonto or irradiation of a light beam modulated based on image signals thereonto, developing the electrostatic latent image into a toner image, and then transferring the toner image to a substrate formed of paper or the like.

On the other hand, various electrophotographic processes for recording a continuous tone image with good gradation reproducibility have heretofore been proposed. For example, in Japanese Patent Publication No. 48(1974)-38172, it has been proposed to employ an electrophotographic process wherein an electrostatic latent image formed on a photoconductor is developed into a toner image by use of a toner, an adhesive tape is then closely contacted with the toner image under pressure to peel off and pick up the toner image onto the adhesive tape, and thereafter the adhesive tape is adhered to a final substrate.

As to the method of transferring the toner image formed on the photoconductor onto a substrate such as paper, the method wherein the toner image is electrostatically transferred by use of a "corotron charger" has been widely used. However, this transfer method has the drawback that the transfer efficiency is low both at high density regions and at low density regions. On the other hand, with the adhesive transfer method wherein the toner image is transferred to the adhesive layer in the manner mentioned above, a very high transfer efficiency can be obtained regardless of the image density. Also from this viewpoint, the proposed electrophotographic process mentioned above is advantageous for the recording of a continuous tone image. FIG. 8 shows an example of the adhesive transfer apparatus for carrying out such an adhesive transfer method.

With the adhesive transfer apparatus shown in FIG. 8, a photosensitive material drum 110 provided with a photoconductor 111 disposed along the circumferential surface is rotated in the direction as indicated by the arrow A, and a toner image is formed on the circumferential surface by a toner image forming means 120 disposed around the photosensitive material drum 110. The toner image forming means 120 is provided with a charger 121, an exposure unit 122, a developing unit 123, a drum drying means 124, a discharger 125, and a cleaning roller 126, which are disposed in the direction of rotation of the photosensitive material drum 110. After the photosensitive material drum 110 is electrostatically given a uniform charge by the charger 121, an electrostatic latent image is formed on the photosensitive material drum 110 by exposure thereof to a light beam modulated in accordance with image information at the exposure unit 122, and is developed into a toner image by the developing unit 123. The toner image thus formed on the photosensitive material drum 110 is dried by the drum drying means 124, and is then transferred by adhesion at a position P1 onto a transparent, belt-shaped transfer sheet 101 which is provided with an adhesive surface and which is applied around a transfer roller 130. The transfer sheet 101 has been fed in the condition laid upon a belt-shaped, release agent coated paper 102 from a sheet feed roller 131, and is separated at a position grasped between nip rollers 132A and 132B from the release agent coated paper 102 which is wound up by a roller 133 for winding up the release agent coated paper. The transfer sheet thus separated from the release agent coated paper 102 is applied around the transfer roller 130 with the adhesive surface thereof facing out, and is moved at a speed equal to the rotation speed of the photosensitive material drum 110 in contact with the photosensitive material drum 110, whereby the toner image is transferred from the photosensitive material drum 110 to the transfer sheet 101.

The transfer sheet 101 onto which the toner image has been transferred is then passed between pressure adherence rollers 140A and 140B as a pair of nip rollers. On the other hand, a belt-shaped supporting sheet 103 formed of paper or the like is delivered from a supporting sheet feed roller 141 toward the pressure adherence rollers 140A and 140B. The supporting sheet 103 is passed between the pressure adherence rollers 140A and 140B together with the transfer sheet 101, and is thus adhered to the transfer sheet 101. The transparent transfer sheet 101 and the supporting sheet 103 adhered to each other are then cut by a cutter 142 in a unit of the image formation region.

However, with the adhesive transfer apparatus mentioned above wherein the belt-shaped transfer sheet 101 is applied around the transfer roller 130 and is passed between the pressure adherence rollers 140A and 140B, the transfer sheet 101 is slackened or pulled forcibly and the image transferred at the position P1 is cracked or distorted in cases where a difference arises between the operation speed of the photosensitive material drum 110 and the operation speeds of the pressure adherence rollers 140A and 140B in the course of the adhesive transfer. Also, at the time that the adhesive transfer is started at the position P1, it is necessary that the leading edge portion of the transfer sheet 101 be grasped between the pressure adherence rollers 140A and 140B. Therefore, no image can be transferred to the leading edge portion of the transfer sheet 101, and a part of the transfer sheet 101 cannot be utilized. Further, since the transfer sheet 101 is shaped in a belt form, it must be cut in a unit of the image formation region after being adhered to the supporting sheet 103. Accordingly, a cutting mechanism such as the cutter 142 must be provided, and the apparatus becomes complicated. Also, in cases where an adhesive material such as the transfer sheet 101 is cut, adhesive is apt to stick to the cutter 142, and troublesome maintenance for keeping the cutter 142 clean is required.

SUMMARY OF THE INVENTION

The primary object of the present invention is to provide an adhesive transfer method wherein adhesive transfer is carried out accurately without giving rise to cracking and distortion of an image.

Another object of the present invention is to provide an adhesive transfer method which enables efficient utilization of transfer sheets for adhesive transfer, and simplification of the apparatus configuration.

A further object of the present invention is to provide an adhesive transfer apparatus for carrying out the adhesive transfer method.

The specific object of the present invention is to provide an image receiving web for adhesive transfer which is suitable for carrying out adhesive transfer without giving rise to cracking and distortion of an image, and which enables efficient utilization of transfer sheets for adhesive transfer and simplification of the apparatus configuration.

The present invention provides an adhesive transfer method comprising the steps of:

(i) separating a transfer sheet, which has been formed in a predetermined shape in advance and is provided with an adhesive surface and which is adhered to a release agent coated paper, from said release agent coated paper and winding said transfer sheet around a transfer roller with said adhesive surface facing out, (ii) contacting said transfer roller under pressure with a photosensitive material drum, which carries a toner image formed on the surface, by movement of said transfer roller with respect to said photosensitive material drum, and transferring said toner image from said photosensitive material drum to said adhesive surface of said transfer sheet while rotating said transfer roller and said photosensitive material drum, and (iii) thereafter moving said transfer roller away from said photosensitive material drum by movement of said transfer roller with respect to said photosensitive material drum, contacting said transfer roller with a push roller under pressure by movement of said transfer roller with respect to said push roller, and passing a supporting sheet together with said transfer sheet between said transfer roller and said push roller, thereby to adhere said transfer sheet to said supporting sheet.

The adhesive transfer method in accordance with the present invention is carried out by an adhesive transfer apparatus comprising:

(i) a photosensitive material drum, (ii) a toner image forming means for forming a toner image on said photosensitive material drum, (iii) a push roller, (iv) a supporting sheet conveyance means for conveying a supporting sheet toward said push roller, (v) a separation means for separating a transfer sheet, which has been formed in a predetermined shape in advance and is provided with an adhesive surface and which is adhered to a release agent coated paper, from said release agent coated paper, and (vi) a transfer roller which is moveable with respect to said photosensitive material drum and said push roller so that said transfer roller takes a first position spaced away from both said photosensitive material drum and said push roller, a second position contacting said photosensitive material drum alone under pressure, and a third position contacting said push roller alone under pressure, winds up said transfer sheet separated by said separation means with said adhesive surface facing out at said first position, transfers said toner image from said photosensitive material drum to said adhesive surface of said transfer sheet at said second position, and adheres said transfer sheet carrying said toner image transferred thereonto and said supporting sheet conveyed by said supporting sheet conveyance means to each other at said third position.

A heat roller should preferably be used as the push roller mentioned above. In this case, fixing of the toner image can be achieved by heat of the push roller in the course of adhesion of the transfer sheet and the supporting sheet to each other.

The present invention also provides an image receiving web for adhesive transfer comprising a belt-shaped, release agent coated paper, and a plurality of transfer sheets each of which is provided with an adhesive surface for receiving a toner image transferred from a photosensitive material drum carrying said toner image on the surface by being contacted under pressure with said photosensitive material drum, and is formed in a predetermined size for carrying said toner image thereon, said transfer sheets being adhered to said belt-shaped, release agent coated paper in the condition put side by side in the longitudinal direction of said release agent coated paper with said adhesive surfaces facing said release agent coated paper.

The transfer sheets of the image receiving web for adhesive transfer in accordance with the present invention may be of any shape insofar as a single transfer sheet can be wound up around the transfer roller. Also, the size of each of the transfer sheets should preferably be adjusted so that a single image formed on the photosensitive material drum can be transferred to the overall surface of the transfer sheet.

With the adhesive transfer method, the adhesive transfer apparatus and the image receiving web for adhesive transfer in accordance with the present invention, the transfer sheet formed in a predetermined shape is used, and the transfer roller around which the transfer sheet has been wound can be selectively contacted under pressure with the photosensitive material drum or the push roller to carry out the adhesive transfer of the toner image or the adhesion of the transfer sheet and the supporting sheet to each other. Therefore, there is no risk of the transfer sheet being contacted with both the photosensitive material drum and the push roller at the same time, and the problem with regard to cracking of the transferred toner image caused by an difference in speed between the photosensitive material drum and the push roller can be eliminated. Also, the adhesive transfer can be carried out from the edge portion of the transfer sheet, and therefore the transfer sheet can be utilized efficiently for the adhesive transfer. Further, since the transfer sheet is formed in advance in a predetermined shape, no mechanism is necessary for cutting the transfer sheet adhered to the supporting sheet in cases where the size of a single transfer sheet is adjusted to a size corresponding to a single image formation region and the supporting sheet is formed in the corresponding shape in advance. Accordingly, it becomes possible to simplify the apparatus and to facilitate the maintenance of the apparatus.

DESCRIPTION OF THE PREFERRED EMBODIMENTS

The present invention will hereinbelow be described in further detail with reference to the accompanying drawings.

Figure 1:
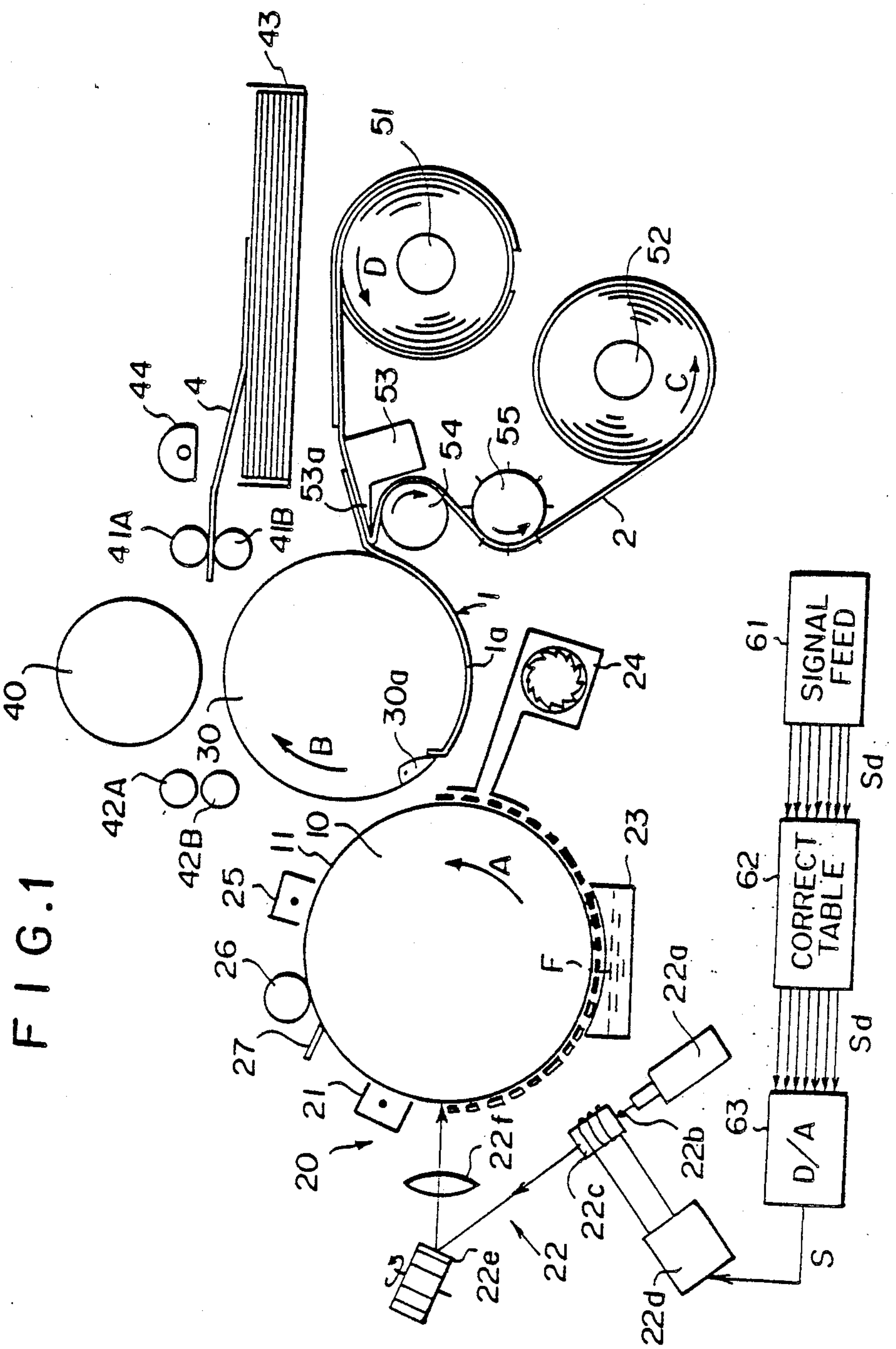
FIG. 1 is a schematic view showing an embodiment of the adhesive transfer apparatus in accordance with the present invention.

With reference to FIG. 1, a photosensitive material drum 10 provided with a photoconductor 11 disposed along the circumferential surface is rotated by a drive means (not shown) in the direction as indicated by the arrow A. A toner image forming means 20 comprising a charger 21, an exposure unit 22, a wet developing unit 23, a drum drying means 24, a discharger 25, a cleaning roller 26, and a cleaning blade 27 is disposed around the photosensitive material drum 10 in the rotating direction thereof.

The exposure unit 22 is provided with a laser beam source 22a constituted by a semiconductor laser, a Ne-Ne laser of the like, a light modulator 22c constituted by an acoustooptic light modulator (AOM), or the like, for intensity modulation of a laser beam 22b emitted by the laser beam source 22a, a modulation circuit 22d for operating the light modulator 22c, a light deflector 22e constituted by a polygon mirror, or the like, for reflecting and deflecting the modulated laser beam 22b so that the laser beam 22b scans on the photosensitive material drum 10 approximately normal to the rotating direction A thereof, and a scanning lens 22f constituted by an fθ lens, or the like, for converging the laser beam 22b into a uniform beam diameter on the photosensitive material drum 10. When image recording is to be carried out on the photosensitive material drum 10, the photosenstive material drum 10 is rotated in the direction as indicated by the arrow A. Also, digital image signals Sd representing a continuous tone image are fed from an image signal feeder 61 to a D/A converter 63 via a correction table 62, and analog signals S generated by the D/A converter 63 are fed to the modulation circuit 22d. The modulation circuit 22d operates the light modulator 22c based on the image signals S, and thus the laser beam 22b is intensity modulated in accordance with the image signals S.

As the photosensitive material drum 10 is rotated in the manner mentioned above, the photoconductor 11 is moved with respect to the charger 21 and is electrostatically given a uniform charge by the charger 21. The uniformally charged photoconductor 11 is then exposed to the laser beam 22b deflected by the light deflector 22e in the manner mentioned above. The laser beam 22b is caused by the aforesaid deflection to scan the photoconductor 11 one-dimensionally in the main scanning direction, and is caused by the rotation of the photosensitive material drum 10 to scan the photoconductor 11 in a sub-scanning direction. As a result, the photoconductor 11 is scanned two-dimensionally by the laser beam 22b. As mentioned above, the laser beam 22b has been modulated based on the image signals S. Therefore, an electrostatic latent image of the image which the image signals S represent is formed on the photoconductor 11 exposed to the laser beam 22b.

The electrostatic latent image is developed by the wet developing unit 23 into a tone image. The wet developing unit 23 develops the electrostatic latent image into the toner image by contacting liquid toner F, which comprises an insulating liquid and minute charged toner particles dispersed therein, with the photoconductor 11, and causing the toner particles to cling to the photoconductor 11 by electrostatic attraction. The density of the toner image thus formed is lower at a portion exposed to the laser beam 22b having a higher intensity, and the gradation of the continuous tone image which the image signals Sd represent is reproduced. After the development is finished, the photosenstive material drum 10 is dried by the drum drying means 24.

On the other hand, a transfer roller 30 is disposed in the vicinity of the photosenstive material drum 10. The transfer roller 30 is moveable among a first position that is spaced away from both the photosensitive material drum 10 and a heating roller 40 which will be described later, a second position that contacts the photosensitive material drum 10 alone under pressure, and a third position that contacts the heating roller 40 alone under pressure. For the period that the toner image is being formed on the photoconductor 11 in the manner mentioned above, the transfer roller 30 is maintained at the first position, and winds up a transfer sheet 1 which has been formed in advance in a predetermined shape suitable for carrying a single image thereon and which is being separated from an image receiving web 3.

Figure 2A:
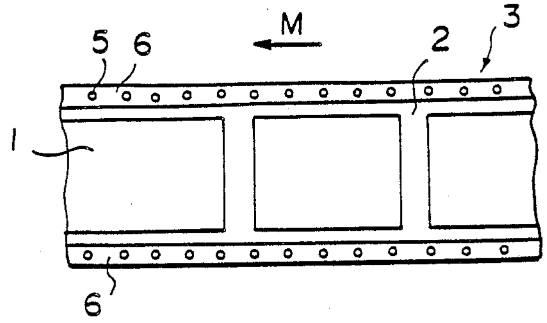
FIG. 2A is a plan view showing an embodiment of the image receiving web for adhesive transfer in accordance with the present invention.
Figure 2B:
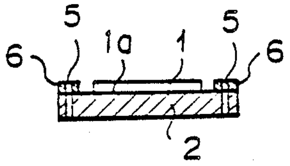
FIG. 2B is a sectional view of the embodiment of the image receiving web for adhesive transfer shown in FIG. 2A.
Figure 3:
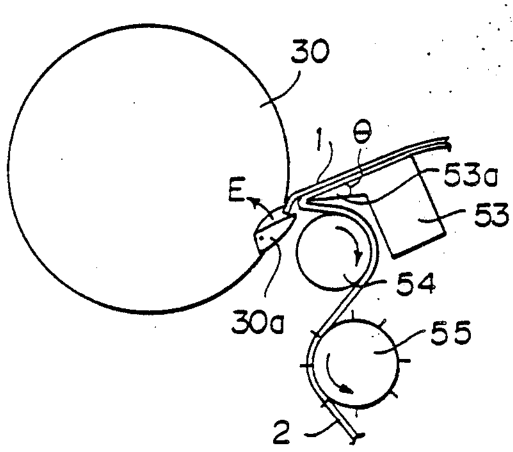
FIG. 3 is an enlarged view showing a part of the embodiment shown in FIG. 1 in the vicinity of the separation means.

As shown in FIG. 2A, the image receiving web 3 comprises a belt-shaped, release agent coated paper 2, and a plurality of transparent transfer sheets 1, 1, . . . adhered to the release agent coated paper 2 in the condition put side by side. As shown in FIG. 2B, the release agent coated paper 2 is provided with step-like portions 6, 6 having thicknesses equal to those of the transfer sheets 1, 1, . . . at both side edges. The step-like portions 6, 6 prevent slacking when the release agent coated paper 2 is wound up, and are provided with perforations 5, 5, . . . for enabling constant-length feed of the release agent coated paper 2. As shown in FIG. 1, the release agent coated paper 2 to which a plurality of the transfer sheets 1, 1, . . . are adhered is wound around a transfer sheet feed roller (image receiving web feed roller) 51 with the transfer sheets 1, 1, . . . facing out. When a wind-up roller 52 disposed in the vicinity of the transfer roller 30 for winding up the release agent coated paper 2 separated from the transfer sheets 1, 1, . . . by a separation means 53 is rotated in the direction as indicated by the arrow C, the transfer sheet feed roller 51 is rotated in the direction as indicated by the arrow D by the rotation of the wind-up roller 52 via feed rollers 54 and 55. The perforations 5, 5, . . . of the release agent coated paper 2 are engaged with sprockets of the feed roller 55, and the release agent coated paper 2 is fed by a predetermined length from the transfer sheet feed roller 51 by the rotation of the feed roller 55. By way of example, as shown in FIG. 3, the separation means 53 is provided with a wedge-shaped supporting base 53*a*, and the leading edge of the transfer sheet 1 is separated from the release agent coated paper 2 by conveying the release agent coated paper 2 at an acute angle at the tip of the supporting base 53*a*. For this purpose, the angle $\theta$ of the leading edge of the supporting base 53*a* should preferably be smaller than 90°. Also, the transfer roller 30 is provided with a claw 30*a* for grasping the leading edge of the transfer sheet 1 separated from the release agent coated paper 2. At the time that the transfer sheet 1 is separated from the release agent coated paper 2, the claw 30*a* is positioned close to the separation means 53, and is opened to the position shown in FIG. 3 for receiving the leading edge of the transfer sheet 1. Then, the claw 30*a* is rotated in the direction as indicated by the arrow E, and fixes the leading edge of the transfer sheet 1. After the leading edge of the transfer sheet 1 is fixed in this manner, the transfer roller 30 is rotated in the direction as indicated by the arrow B in FIG. 1, and winds up the single transfer sheet 1 around the circumferential surface. The wound-up transfer sheet 1 is in such a condition that the outer surface thereof, i.e. the surface which was in contact with the release agent coated paper 2, constitutes an adhesive surface 1*a*. In cases where the transfer sheet 1 does not fit snugly to the circumferential surface of the transfer roller 30, a suction means for sucking the tailing edge of the transfer sheet 1 may be provided inside of the transfer roller 30.

Figure 4:
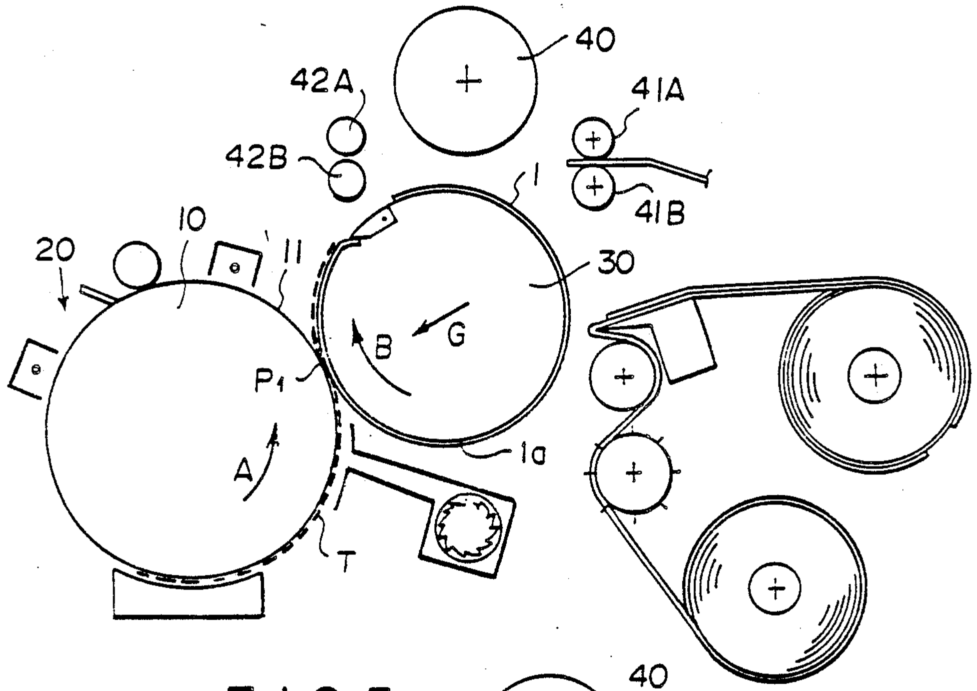
FIG. 4 is a schematic view showing the condition of the embodiment shown in FIG. 1 at the time of adhesive transfer.

At the time that arrival of the toner-developed portion of the photosensitive material drum 10 at a point immediately prior to the position facing the transfer roller 30 is detected or recognized by a known means, the transfer roller 30 is moved in the direction as indicated by the arrow G in FIG. 4 to the aforesaid second position and contacts under pressure with the photosensitive material drum 10. The transfer sheet 1 on the transfer roller 30 is thus pushed against the photoconductor 11, and the transfer roller 30 follows the photosensitive material drum 10 which is rotated in the direction as indicated by the arrow A, and is thus rotated in the direction as indicated by the arrow B. In this manner, the toner image T is taken up from the photoconductor 11 to the adhesive surface 1a of the transparent transfer sheet 1.

As shown in FIG. 1, a supporting sheet holding tray 43 which houses a plurality of supporting sheets 4, 4, . . . formed of paper and having shapes similar to those of the transfer sheets 1, 1, . . . is disposed above the transfer sheet feed roller 51. Before the adhesive transfer of the toner image to the transfer sheet 1 is completed, a single supporting sheet 4 is taken up from the supporting sheet holding tray 43 by a suction means 44, and is grasped between sheet conveying rollers 41A and 41B. Take-out of the supporting sheet 4 may be carried out at any point of time before the adhesive transfer of the toner image to the transfer sheet 1 is completed.

Figure 5:
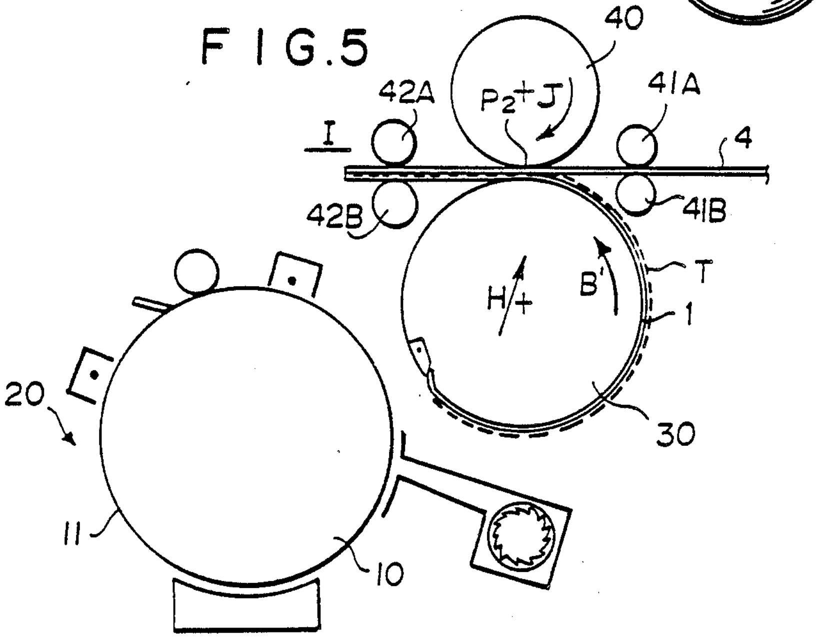
FIG. 5 is a schematic view showing the condition of the embodiment shown in FIG. 1 at the time of adhesion of the transfer sheet and the supporting sheet to each other.

When almost the overall circumference of the transfer roller 30 has been contacted with the photoconductor 11 and the adhesive transfer of the toner image to the transfer sheet 1 is finished, the transfer roller 30 is moved in the direction as indicated by the arrow H shown in FIG. 5 to the aforesaid third position. Thus the transfer roller 30 is moved away from the photosensitive material drum 10 and is contacted under pressure with the heating roller 40 acting in the same manner as a push roller. Before the transfer roller 30 is contacted with the heating roller 40 under pressure, the supporting sheet 4 is conveyed by the supporting sheet conveying rollers 41A and 41B so that the leading edge is disposed at a pressure contact position P2. Also, the transfer roller 30 is disposed so that the tailing edge of the transfer sheet 1, i.e. the edge thereof opposite to the claw 30*a*, is at the position P2. The transfer roller 30 follows the heating roller 40 as it rotates in the direction as indicated by the arrow J and is thus rotated reversely, in the direction as indicated by the arrow B'. The supporting sheet 4 and the transfer sheet 1 carrying the toner image formed thereon are conveyed between the heating roller 40 and the transfer roller 30 in the direction as indicated by the arrow I, and are adhered to each other. At the time of said adherence, the toner image is fixed by heat of the heating roller 40. The purpose of rotating the transfer roller 30 reversely at the time of carrying out said adherence is for smoothly effecting the adherence of the portion of the transfer sheet 1 near the edge fixed by the claw 30*a* and the supporting sheet 4 to each other, and smoothly separating the fixed edge from the transfer roller 30. In cases where the fixing of the transfer sheet 1 to the transfer roller 30 is carried by the other methods, for example, by suction of the overall surface of the transfer sheet 1, the transfer roller 30 may be rotated in the direction as indicated by the arrow B also at the time of said adherence. Also, the fixing of the toner image by heat need not necessarily be carried out by the heating roller 40. Thus the heating roller 40 may be replaced by an ordinary push roller, and a heating means may be provided independently.

Figure 6:
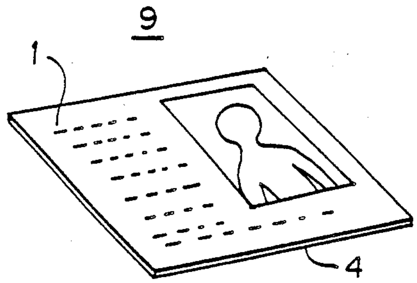
FIG. 6 is a perspective view showing a print obtained with the embodiment shown in FIG. 1, FIGS. 7A to 7E are plane views showing further embodiments of the image receiving web for adhesive transfer in accordance with the present invention.
Figure 8:
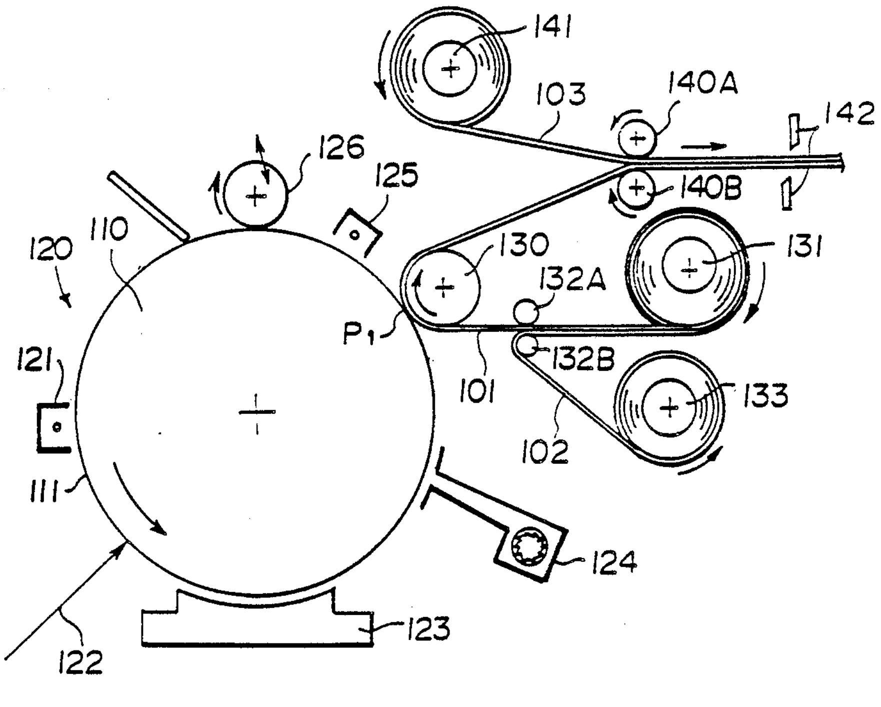
FIG. 8 is a schematic view showing the conventional adhesive transfer apparatus.

The adherence of the transfer sheet 1 and the supporting sheet 4 to each other is carried out in the manner mentioned above at the position P2, and the transfer sheet 1 and the supporting sheet 4 are fed out by feed-out rollers 42A and 42B. In this manner, as shown in FIG. 6, a print 9 comprising the supporting sheet 4, the transparent transfer sheet 1 adhered to the supporting sheet 4, and a continuous tone image recorded with the toner image T therebetween is obtained.

After the adhesive transfer of the toner image is finished, the photoconductor 11 is discharged by the discharger 25, and cleaned by the cleaning roller 26 and the cleaning blade 27, so that the photoconductor 11 can be utilized for the next image recording.

With the embodiment mentioned above wherein the transfer sheet 1 is formed in advance in a size suitable for carrying a single image thereon and is wound up around the transfer roller 30 an the adhesive transfer and the adherence of the transfer sheet 1 and the supporting sheet 4 to each other is carried out by moving the transfer roller 30, there is no risk of the toner image being disturbed by a difference in speed between two or more operation means as in the case where the transfer sheet 1 is contacted with two or more operation means at the same time. Also, each of the transfer sheets 1, 1, . . . is shaped so that the toner image can be formed over the overall area, and therefore the transfer sheets 1, 1, .

. . can be utilized efficiently. Further, since a print of a single image can be obtained immediately by adhering the transfer sheet 1 and the supporting sheet 4 to each other, no cutter or the like is necessary. Therefore, the apparatus can be simplified and the apparatus maintenance becomes easy.

In the aforesaid embodiment, the transfer roller 30 alone is moved with respect to the photosensitive material drum 10 and the heating roller 40. However, it is only necessary that these components be moved relative to each other, and the photosensitive material drum 10 and/or the heating roller 40 may be moved with respect to the transfer roller 30. Also, the transfer sheet 1 may be of any size insofar as a single transfer sheet 1 can be wound around the transfer roller 30. For example, in cases where a plurality of images are to be recorded side by side, the size of the transfer sheet 1 may be adjusted to carry two or more images thereon. Also, it is only necessary that one or the other of the transfer sheet 1 and the supporting sheet 4 be transparent, and the supporting sheet 4 may be made transparent instead of making the transfer sheet 1 transparent. Though the aforesaid embodiment is applied to an electrophotographic printer for recording a continuous tone image, the adhesive transfer method and apparatus are applicable also to the cases of recording or copying of black/-white two-valued images.

The image receiving web 3 shown in FIG. 2A should preferably be formed so that the leading edge of the transfer sheet 1 in the conveyance direction as indicated by the arrow kM and the positions of the perforations 5, 5, . . . align each other. Such a configuration is more advantageous for the constant-length conveyance.

Figure 7A:
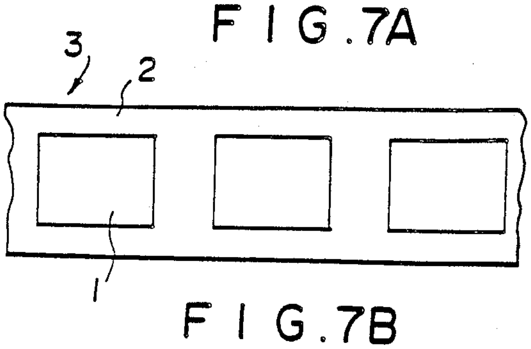
Figure 7B:
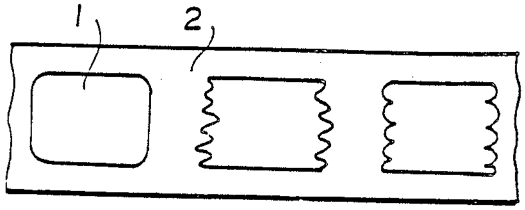
Figure 7C:
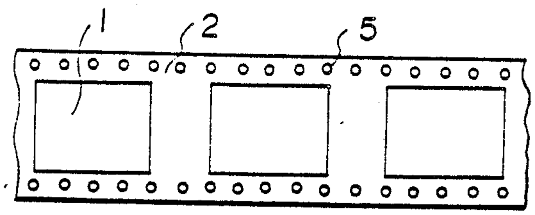
Figure 7D:
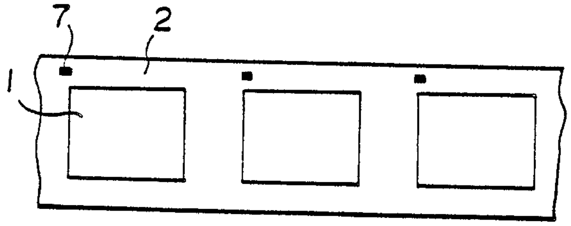
Figure 7E:
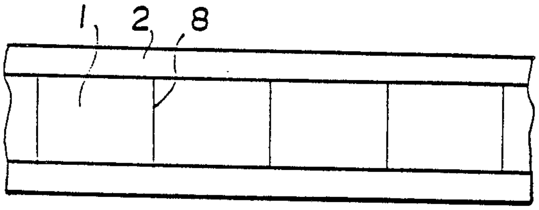

Further embodiments of the image receiving web 3 will hereinbelow be described with reference to FIGS. 7A to 7E. The image receiving web 3 shown in FIG. 7A comprises the belt-shaped release agent coated paper 2 having a surface on which a release agent such as Si is coated, and a plurality of transparent transfer sheets 1, 1, . . . adhered to the release agent coated paper 2 in the condition put side by side at predetermined intervals in the longitudinal direction of the release agent coated paper 2. In the image receiving web 3 shown in FIG. 7B, the contour shapes of the transfer sheets 1, 1, . . . are modified so that the corners are rounded or the leading edges and the tailing edges are provided with protrusions and recessed. With the image receiving web 3 shown in FIG. 7B, separation of the transfer sheets 1, 1, . . . from the release agent coated paper 2 can be achieved more easily. The image receiving web 3 shown in FIG. 7C is provided with perforations 5, 5, . . . at both side edges of the release agent coated paper 2 for enabling constant-length feed of the release agent coated paper 2. Further, as shown in FIG. 7D, a position detection means such as blip marks 7, 7, . . . may be formed on the image receiving web 3 shown in FIGS. 2A, 7A, 7B or 7C so that the position of the image receiving web 3 can be detected accurately. The transfer sheets 1, 1, . . . need not necessarily be adhered to the release agent coated paper 2 in a spaced relation to one another. Thus as shown in FIG. 7E, a plurality of the transfer sheets 1, 1, . . . may be laid continuously with cut lines 8, 8, . . . formed so that the transfer sheets 1, 1, . . . can be separated one after another from the release agent coated paper.2. In cases where the image receiving web 3 having no perforations is used, the feed roller 55 shown in FIG. 1 may be replaced by a roller having no sprocket.

With the image receiving web for adhesive transfer in accordance with the present invention, the transfer sheet can be wound around the transfer roller and can be moved away from the push roller, i.e. from the heating roller 40 in the aforesaid embodiment, at the time of adhesive transfer by movement of the transfer roller between the adhesive transfer step and the step of adhesion of the transfer sheet and the supporting sheet to each other. Therefore, the toner image formed on the transfer sheet can be prevented from being disturbed by a difference in speed between the photosensitive material drum and the push roller. Also, since the transfer sheets are formed so that a toner image can be formed over the overall surface of each transfer sheet, the transfer sheets can be utilized efficiently. Further, in cases where the supporting sheets having the same shapes as the transfer sheets are used, a print of a single image can be obtained immediately by adhering the transfer sheet and the supporting sheet to each other, and therefore no cutter or the like is necessary. Therefore, the adhesive transfer apparatus can be simplified and in the apparatus maintenance becomes easy.

We claim:

1. An image receiving web for adhesive transfer comprising a belt-shaped, release agent coated paper, and a plurality of transfer sheets each of which is provided with an image receiving adhesive surface for receiving a toner image transferred from a photosensitive material drum carrying said toner image on the surface by being contacted under pressure with said photosenstive material drum, and is formed in a predetermined sizE for carrying said toner image thereon, said transfer sheets being adhered to said belt-shaped, release agent coated paper in the condition put side by side in the longitudinal direction of said release agent coated paper with said image receiving adhesive surfaces facing said release agent coated paper.

2. An image receiving web for adhesive transfer as defined in claim 1 wherein said belt-shaped, release agent coated paper is provided with perforations at both side edges.

3. An image receiving web for adhesive transfer as defined in claim 1 wherein said belt-shaped, release agent coated paper is provided with step-like portions having a thickness substantially equal to the thickness of each of said transfer sheets at both side edges, and said step-like portions are provided with perforations.

4. An image receiving web for adhesive transfer as defined in claim 1 wherein said belt-shaped, release agent coated paper is provided with a position detection means for detection of the position of said image receiving web.

* * * * *